(12) United States Patent
Wang

(10) Patent No.: US 12,510,983 B2
(45) Date of Patent: *Dec. 30, 2025

(54) TOUCH DISPLAY PANEL WITH REFLECTION REDUCING STRUCTURE LAYER AND DISPLAY DEVICE

(71) Applicant: BOE Technology Group Co., Ltd., Beijing (CN)

(72) Inventor: Hejin Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,235

(22) Filed: Sep. 9, 2024

(65) Prior Publication Data

US 2024/0427446 A1 Dec. 26, 2024

Related U.S. Application Data

(63) Continuation of application No. 17/757,928, filed as application No. PCT/CN2021/115785 on Aug. 31, 2021, now Pat. No. 12,153,748.

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05)

(58) Field of Classification Search
CPC ...................................................... G06F 3/0412
See application file for complete search history.

(56) References Cited

U.S. PATENT DOCUMENTS

2021/0328199 A1* 10/2021 Yao ..................... H10K 59/353
2021/0334504 A1* 10/2021 Lu ....................... H10F 39/8053
2021/0341804 A1* 11/2021 Kuroe ................. G02F 1/13338

* cited by examiner

*Primary Examiner* — Chun-Nan Lin
(74) *Attorney, Agent, or Firm* — Workman Nydegger

(57) ABSTRACT

The present disclosure provides a touch display panel and a display device. The touch display panel includes: a base substrate; a display structure layer arranged at a side of the base substrate, and having a plurality of pixels; a touch structure layer arranged at a side of the display structure layer away from the base substrate, and comprising a plurality of touch openings exposing the plurality of pixels; and a reflection reducing structure layer arranged at a side of the touch structure layer away from the display structure layer, and comprising a first insulation layer, a first light absorption layer and a second insulation layer that are laminated; the first light absorption layer comprises a plurality of first light absorption patterns corresponding to the touch openings, and orthographic projections of the touch openings on the base substrate cover orthographic projections of the first light absorption patterns on the base substrate.

20 Claims, 15 Drawing Sheets

TOUCH DISPLAY PANEL WITH REFLECTION REDUCING STRUCTURE LAYER AND DISPLAY DEVICE

CROSS-REFERENCE TO RELATED APPLICATION

This application is a continuation of U.S. application Ser. No. 17/757,928, filed Jun. 23, 2022, which is a national phase entry under 35 U.S.C § 371 of International Application No. PCT/CN2021/115785, filed Aug. 31, 2021, the entire content of which is hereby incorporated by reference.

FIELD

The present disclosure relates to the technical field of semiconductors, and in particular to a touch display panel and a display device.

BACKGROUND

In the existing organic light emitting display technology, a circular polarizer and a touch screen need to be bonded with glue to form a display module. The circular polarizer is capable of reducing reflection of an organic light emitting surface and improving contrast, while the touch screen is used for inputting. However, the overall thickness of the display module is rather thick, affecting foldability of a flexible screen.

SUMMARY

The present disclosure provides a touch display panel and a display device. The touch display panel includes: a base substrate;
  a display structure layer, arranged at a side of the base substrate, and having a plurality of pixels;
  a touch structure layer, arranged at a side of the display structure layer away from the base substrate, and including a plurality of touch openings exposing the plurality of pixels; and
  a reflection reducing structure layer, arranged at a side of the touch structure layer away from the display structure layer, and including a first insulation layer, a first light absorption layer and a second insulation layer that are laminated, wherein the first light absorption layer includes a plurality of first light absorption patterns corresponding to the plurality of touch openings, and orthographic projections of the plurality of touch openings on the base substrate cover orthographic projections of the plurality of first light absorption patterns on the base substrate.

In a possible implementation, the orthographic projections of the plurality of first light absorption patterns on the base substrate cover orthographic projections of the plurality of pixels on the base substrate.

In a possible implementation, the touch display panel further includes a black matrix layer arranged on a of the reflection reducing structure layer facing away from the touch structure layer, the black matrix layer is provided with a plurality of black matrix openings for exposing the plurality of pixels, and the plurality of black matrix openings correspond to the plurality of pixels in a one-to-one correspondence; and
  the orthographic projections of the plurality of first light absorption patterns on the base substrate cover orthographic projections of the plurality of black matrix openings on the base substrate, and the orthographic projections of the plurality of black matrix openings on the base substrate cover the orthographic projections of the plurality of pixels on the base substrate.

In a possible implementation, extension lines of two adjacent edges of at least two adjacent black matrix openings intersect each other.

In a possible implementation, any one of the plurality of black matrix openings includes at least one straight edge, and straight edges facing a same direction of adjacent black matrix openings are not parallel to each other.

In a possible implementation, at least one corner of any one of the plurality of black matrix openings includes an arc-shaped corner.

In a possible implementation, a shape of an orthographic projection, on the base substrate, of any one of the plurality of black matrix openings is circular or oval.

In a possible implementation, an overlapping region exist between an orthographic projection of a first light absorption pattern on the base substrate and black matrices at edges of a black matrix opening, and an area of the overlapping region account for 0% to 40% of an area of the orthographic projection of the first light absorption pattern on the base substrate in area.

In a possible implementation, a maximum distance k3 between an edge of the touch opening and an edge of a first light absorption pattern satisfies a following formula:

$$k3=(k1-k2)/2,$$

where k1 represents a maximum distance between two adjacent pixels, and k2 represents a minimum touch line width.

In a possible implementation, the plurality of pixels include a first pixel, a second pixel and a third pixel, an area of an orthographic projection of the second pixel on the base substrate is larger than an area of an orthographic projection of the first pixel on the base substrate, and the area of the orthographic projection of the second pixel on the base substrate is larger than an area of an orthographic projection of the third pixel on the base substrate;
  the plurality of touch openings include a plurality of first touch openings and a plurality of second touch openings;
  one of the plurality of first touch openings exposes a corresponding second pixel, and an orthographic projection of a first touch openings on the base substrate covers an orthographic projection of the corresponding second pixel on the base substrate; and
  one of the plurality of second touch openings exposes a corresponding first pixel and a corresponding third pixels, and an orthographic projection of a second touch opening on the base substrate covers an orthographic projection of the corresponding first pixel on the base substrate, and covers an orthographic projection of the corresponding third pixel on the base substrate.

In a possible implementation, the touch display panel further includes a film packaging structure layer arranged between the display structure layer and the touch structure layer. The film packaging structure layer includes a first inorganic packaging layer, an organic packaging layer and a second inorganic packaging layer that are sequentially arranged in a laminated manner.

In a possible implementation, the touch display panel further includes an organic protective layer arranged on a side of the black matrix layer facing away from the touch structure layer.

In a possible implementation, the touch display panel further includes a third inorganic insulation layer arranged on a side of the organic protective layer facing away from the touch structure layer. Materials of the third inorganic insulation layer include at least one of silicon oxide, silicon nitride, or silicon oxynitride.

In a possible implementation, the touch structure layer includes a first touch metal sub-layer, a second touch metal sub-layer arranged on a side of the first touch metal sub-layer away from the display structure layer, and a first touch insulation layer arranged between the first touch metal sub-layer and the second touch metal sub-layer;

the second touch metal sub-layer includes a plurality of first touch electrode blocks, and each of the first touch electrode blocks includes the plurality of touch openings; and the first touch metal sub-layer includes a plurality of first touch leads corresponding to the first touch electrode blocks one to one, and each of the plurality of first touch leads is electrically connected to a corresponding first touch electrode block through a via hole penetrating the first touch insulation layer.

In a possible implementation, the touch structure layer includes a third touch metal sub-layer, a fourth touch metal sub-layer arranged on a side of the third touch metal sub-layer facing away from the display structure layer, and a second touch insulation layer arranged between the third touch metal sub-layer and the fourth touch metal sub-layer;

the fourth touch metal sub-layer includes a plurality of first touch electrode strips extending in a first direction and a plurality of second touch electrode strips extending in a second direction; any one of the plurality of first touch electrode strips includes a plurality of second touch electrode blocks that are electrically connected integrally, and any one of the plurality of second touch electrode strips includes a plurality of third touch electrode blocks; any one of the plurality of second touch electrode blocks includes the plurality of touch openings, and any one of the plurality of third touch electrode blocks includes the plurality of touch openings; and the third touch metal sub-layer includes a plurality of bridging parts, and two adjacent third touch electrode blocks are electrically connected by means of a corresponding bridging part of the plurality of bridging parts.

In a possible implementation, materials of the first insulation layer include at least one of silicon oxide, silicon nitride, or silicon oxynitride; and materials of the second insulation layer include at least one of silicon oxide, silicon nitride, or silicon oxynitride.

In a possible implementation, the first insulation layer includes a first inorganic insulation sub-layer, and a second inorganic insulation sub-layer arranged on a side of the first inorganic insulation sub-layer facing the first light absorption layer; and a material of the second inorganic insulation sub-layer includes silicon nitride, and a material of the first inorganic insulation sub-layer includes silicon oxide.

In a possible implementation, the second insulation layer includes a third inorganic insulation sub-layer, and a fourth inorganic insulation sub-layer arranged on a side of the third inorganic insulation sub-layer facing the first light absorption layer; and a material of the fourth inorganic insulation sub-layer includes silicon nitride, and a material of the third inorganic insulation sub-layer includes silicon oxide.

In a possible implementation, a transmittance of the reflection reducing structure layer ranges from 40% to 60% and a reflectivity of reflection reducing structure layer ranges from 0% to 10%.

In a possible implementation, a thickness of the first light absorption layer accounts for 0.1%-10% of a thickness of the reflection reducing structure layer.

In a possible implementation, a material of the first light absorption layer includes Ti, Mo, Cu, Al or Ag.

Embodiments of the present disclosure further provide a display device, which includes the touch display panel provided in the embodiments of the present disclosure.

DETAILED DESCRIPTION OF THE EMBODIMENTS

For making the objectives, technical solutions and advantages of embodiments of the present disclosure more obvious, the technical solutions of the embodiments of the present disclosure will be clearly and completely described below in conjunction with the accompanying drawings in the embodiments of the present disclosure. Apparently, the embodiments described are some rather than all of the embodiments of the present disclosure. Based on the embodiments of the present disclosure, all other embodiments acquired by those of ordinary skill in the art without making creative efforts fall within the scope of protection of the present disclosure.

Unless otherwise defined, technical or scientific terms used in the present disclosure should have ordinary meanings as understood by those of ordinary skill in the art to which the present disclosure belongs. The "first", "second" and similar words used in the present disclosure do not indicate any order, amount or importance, but are only used to distinguish different components. "Including", "comprising" or other similar words indicate that the elements or objects before the word include elements or objects after the word and their equivalents, without excluding other elements or objects. "Connecting", "connected" or other similar words are not limited to physical or mechanical connections, but may include electrical connections, which may be direct or indirect. "Upper", "lower", "left" and "right" are only used to indicate a relative positional relation. After an absolute position of the described object changes, the relative positional relation may also change accordingly.

To keep the following description of the embodiments of the present disclosure clear and concise, detailed descriptions of known functions and components are omitted in present disclosure.

Figure 1A:
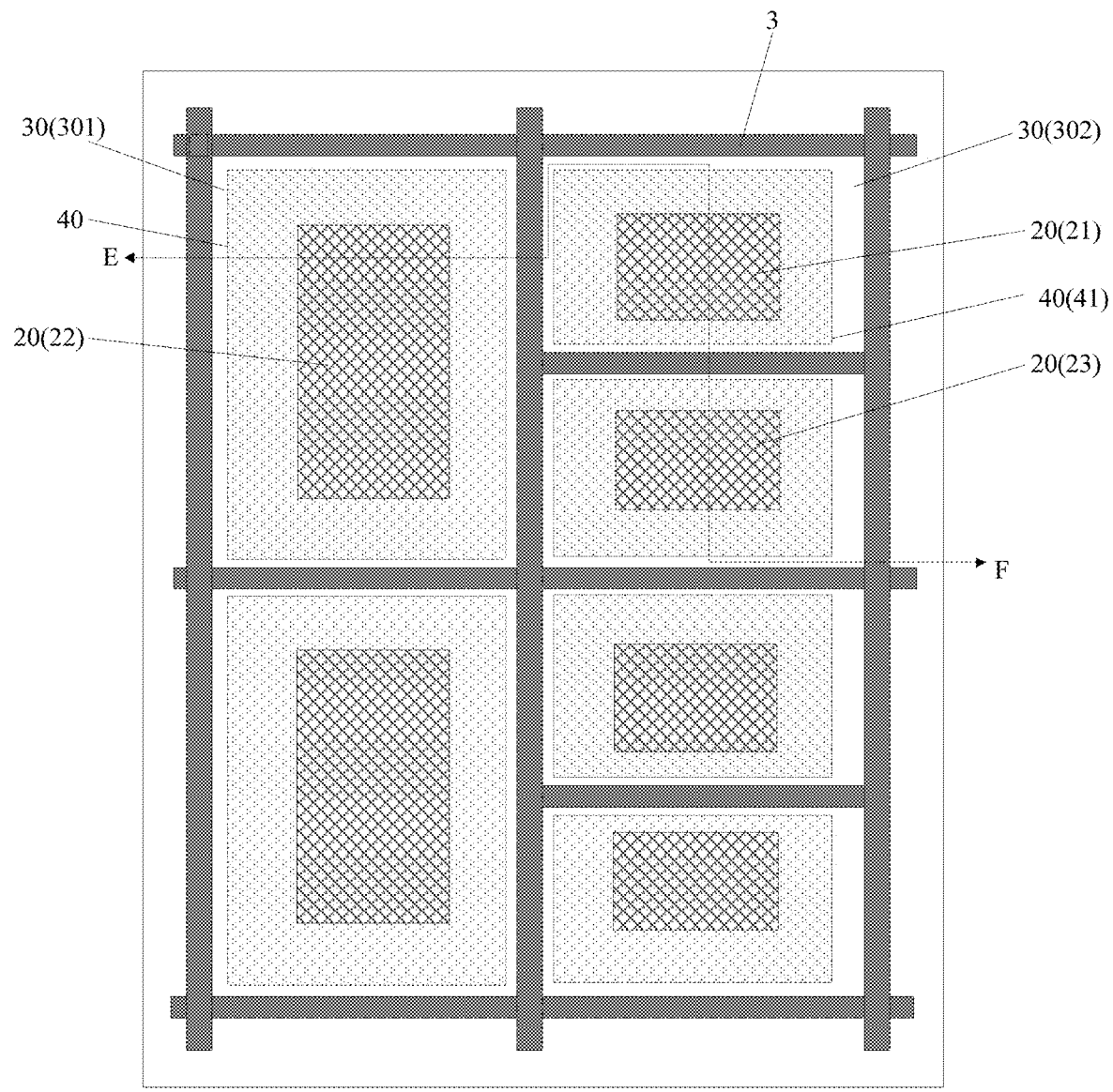
FIG. 1A is a first schematic diagram of a top view of a touch display panel provided in an embodiment of the present disclosure.
Figure 2:
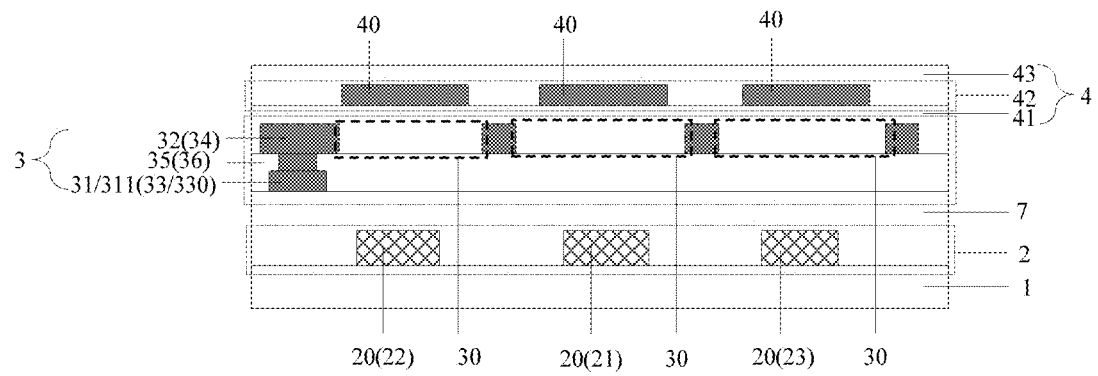
FIG. 2 is a schematic diagram of a section along a dotted line EF in FIG. 1A.

With reference to FIGS. 1A and 2, FIG. 2 is a schematic diagram of a section along a dotted line EF in FIG. 1A. The embodiments of the present disclosure provide a touch display panel. The touch display panel includes: a base substrate 1, a display structure layer 2, a touch structure layer 3 and a reflection reducing structure layer 4.

The display structure layer 2 is arranged at a side of the base substrate, and the display structure layer 2 has a plurality of pixels 20, for example, the plurality of pixels 20 may include a first pixels 21, a second pixel 22, and a third pixel 23; the first pixel 21 may include a red pixel, the second pixel 22 may include a blue pixel, and the third pixel 23 may include a green pixel; and the display structure layer 2 may further include a pixel defining layer, the pixel defining layer may be provided with a plurality of pixel openings, and a region where the plurality of pixels 20 are located may be defined by the plurality of pixel openings.

Figure 1B:
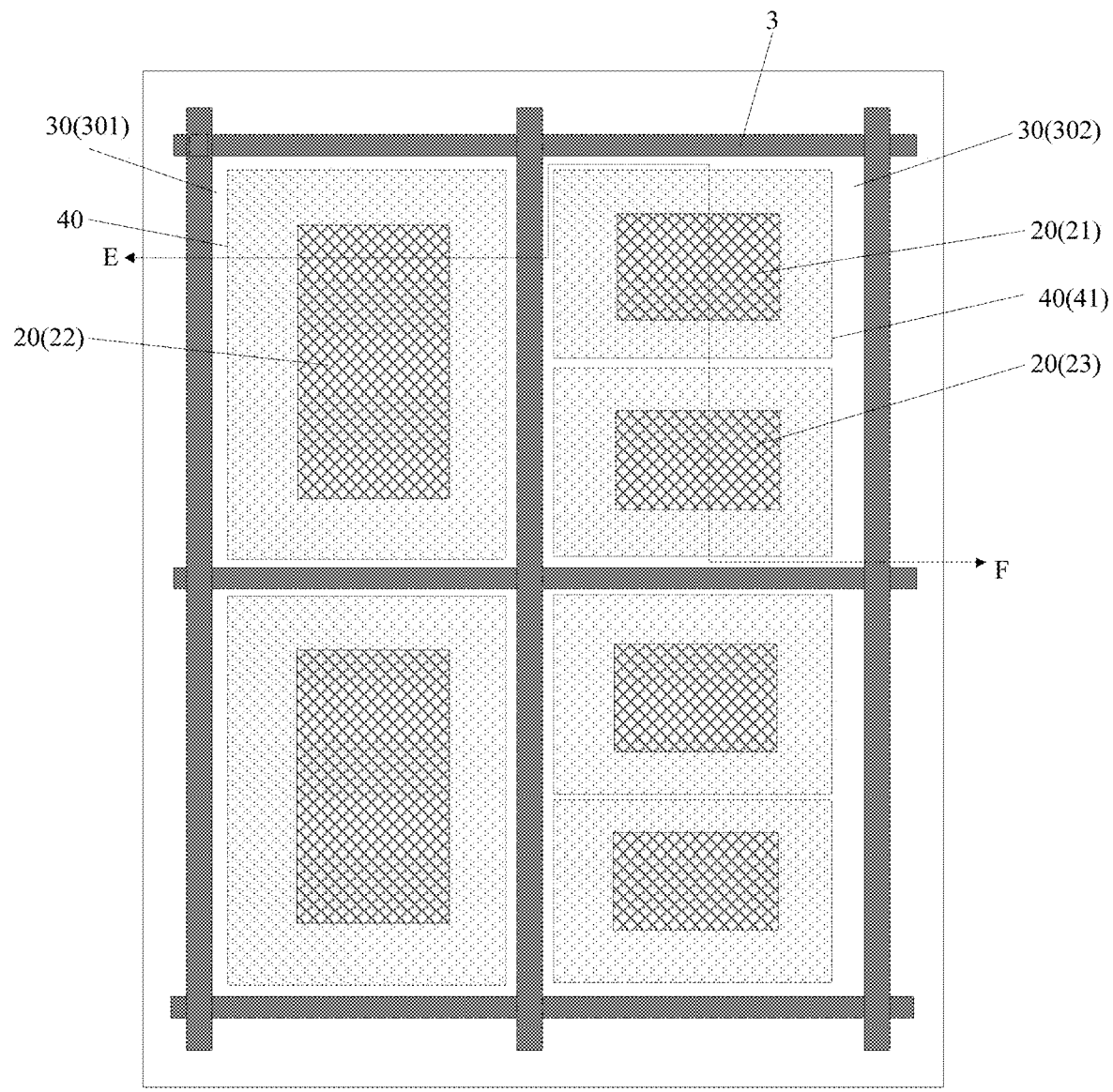
FIG. 1B is a second schematic diagram of a top view of a touch display panel provided in an embodiment of the present disclosure.

The touch structure layer 3 is arranged on a side of the display structure layer 2 away from the base substrate 1, the touch structure layer 3 includes a plurality of touch openings 30 exposing the plurality of pixels 20, specifically, in the case of a corresponding relation between the touch openings 30 and the pixels 20, for all the plurality of touch openings 30, one of the plurality of touch openings 30 may expose one corresponding pixel 20, as shown in FIG. 1A, or for some of the plurality of touch openings 30, one of the touch openings 30 may expose one corresponding pixel, and for remaining touch openings 30, one of the remaining touch openings 30 may expose two corresponding pixels 20, as shown in FIG. 1B, such that a manufacturing process of the touch structure layer 3 may be simplified.

The reflection reducing structure layer 4 is arranged at a side of the touch structure layer 3 away from the display structure layer 2, the reflection reducing structure layer 4 at least includes a first insulation layer 41, a first light absorption layer 42 and a second insulation layer 43 that are laminated, for example, the first insulation layer 41 and/or the second insulation layer 43 include an inorganic layer, and the first light absorbing layer 42 includes a metal layer, where the first light absorption layer 42 includes a plurality of first light absorption patterns 40 corresponding to the plurality of touch openings 30, and orthographic projections of the plurality of touch openings 30 on the base substrate 1 cover orthographic projections of the plurality of first light absorption patterns 40 on the base substrate 1. That is, an area of the orthographic projections of the touch openings 30 on the base substrate 1 is larger than an area of the orthographic projections of the first light absorption pattern 40 on the base substrate 1, the orthographic projection of the first light absorption pattern 40 on the base substrate 1 is located in the orthographic projection of the touch opening 30 on the base substrate 1, and the touch opening 30 completely expose a corresponding first light absorption pattern 40.

In the embodiments of the present disclosure, the touch display panel includes the touch structure layer 3 arranged at a side of the display structure layer 2 away from the base substrate 1 and the reflection reducing structure layer 4 arranged at a side of the touch structure layer 3 away from the display structure layer 2. The reflection reducing structure layer 4 includes the plurality of first light absorption patterns 40 corresponding to the touch openings 30 one to one. The first light absorption patterns 40 are capable of absorbing light incident on the region where the plurality of pixels 20 are located and reducing re-reflection of the light incident on the region where the plurality of pixels 20 are located, and may replace a circular polarizer. In this way, compared with a display panel to which a touch screen and the circular polarizer are bonded with glue, the embodiments of the present disclosure integrates the touch structure layer 3 and the reflection reducing structure layer 4 at a side of the display structure layer 2, thereby achieving a touch function, reducing external light reflection, reducing an overall thickness of the touch display panel and achieving an optimal repetitive foldability. In addition, in the embodiment of the present disclosure, the orthographic projections of the touch openings 30 on the base substrate 1 cover the orthographic projections of the first light absorption patterns 40 on the base substrate 1, and the problem that touch electrode blocks of the touch structure layer 3 overlap the first light absorption patterns 40 to form overlap capacitance, resulting in failure of the touch structure layer 3 and no touch function may be solved.

Accordingly, the first insulation layer 41 and the second insulation layer 43 are capable of reducing reflection and improving transmittance. However, light cannot be eliminated. The first light absorption layer 42 is capable of absorbing external light and consuming transmitted light. The three layers cooperate with each other to eliminate surface reflection. In this way, the whole reflection reducing structure layer 4 may absorb the external light and replace the circular polarizer, so as to reduce external ambient light reflection.

Figure 1C:
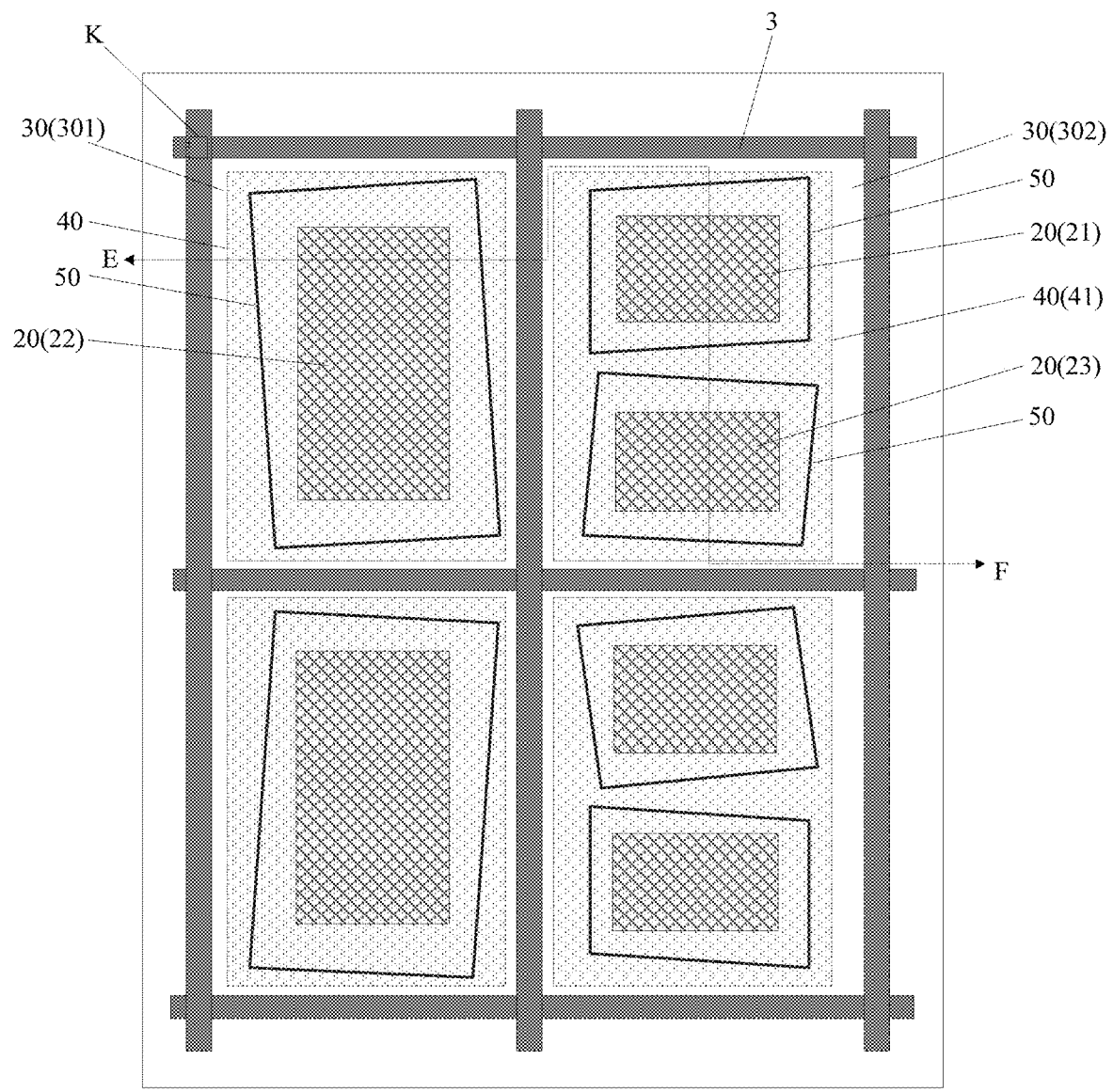
FIG. 1C is a third schematic diagram of a top view of a touch display panel provided in an embodiment of the present disclosure.

In a possible implementation, in the touch display panel, for some of the plurality of touch openings 30, one of the some touch openings 30 may correspond to one first light absorption pattern 40, and for remaining touch openings 30, one of the remaining touch openings 30 may correspond to two first light absorption patterns 40, as shown in FIG. 1B. In a possible implementation, in the touch display panel, for all the plurality of touch openings 30, one of the plurality of touch openings 30 corresponds to one first light absorption pattern 40, as shown in FIGS. 1A and 1C. Therefore, the number of the first light absorption patterns 40 may be reduced, and a manufacturing process of the touch display panel may be simplified.

In a possible implementation, with reference to FIG. 1B, an area of an orthographic projection of the second pixel 22 on the base substrate 1 is larger than an area of an orthographic projection of the first pixel 21 on the base substrate 1, and the area of the orthographic projection of the second pixel 22 on the base substrate 1 is larger than an area of an orthographic projection of the third pixel 23 on the base substrate 1. Specifically, the first pixel 21 may include the red pixel, the second pixel 22 may include the blue pixel, and the third pixel 23 may include the green pixel. That is, an area of the blue pixel is the largest, unit luminous brightness of blue may be reduced, while overall light output is consistent. Since the unit luminous brightness is low, the service life of blue pixel may be prolonged, so as to improve a short luminous life of a blue luminescent material.

In a possible implementation, the plurality of touch openings 30 include a plurality of first touch openings 301 and a plurality of second touch openings 302. One of the first touch openings 301 exposes a corresponding second pixel 22, and an orthographic projection of the first touch opening 301 on the base substrate 1 covers an orthographic projection of the corresponding second pixel 22 on the base substrate 1. One of the second touch openings 302 exposes a corresponding first pixel 21 and a corresponding third pixel 23, and an orthographic projection of the second touch opening 302 on the base substrate 1 covers the orthographic projection of the corresponding first pixel 21 on the base substrate 1, and covers the orthographic projection of the corresponding third pixel 23 on the base substrate 1.

In a possible implementation, as shown in FIGS. 1A, 1, 1C and 2, the orthographic projections of the plurality of first light absorption patterns 40 on the base substrate 1 cover orthographic projections of the plurality of pixels 20 on the base substrate 1. In this way, the touch display panel may have low reflectivity. When the pixels 20 of the improved touch display panel include a reflective electrode, the region where the pixels 20 are located may have high reflectivity. Specifically, conventional top-emitting organic light-emitting devices have high light-emitting efficiency because of a microcavity enhancement effect. A specific structure is a bottom highly reflective anode/organic light-emitting layer/semi-transparent and semi-reflective cathode. Due to the need of color separate display, the structure actually includes the highly reflective anode with patterned pixels and the semi-transparent and semi-reflective cathode on a whole surface. Reflectivity of the highly reflective anode/organic light-emitting layer/semi-transparent and semi-reflective cathode is about 70%, and reflectivity of a surface of the semi-transparent and semi-reflective cathode is about 30%-40%. In the region where the pixels are located, the pixels themselves, a blank region or a routing region has high reflectivity. In the embodiments of the present disclosure, the orthographic projections of the plurality of first light absorption patterns 40 on the base substrate 1 cover the orthographic projections of the plurality of pixels 20 on the base substrate 1. In this way, the touch display panel may have low reflectivity. For example, compared with a touch display panel without the first light absorption patterns 40, the touch display panel provided in the embodiments of the present disclosure may reduce reflectivity by 0%-5%.

Figure 1D:
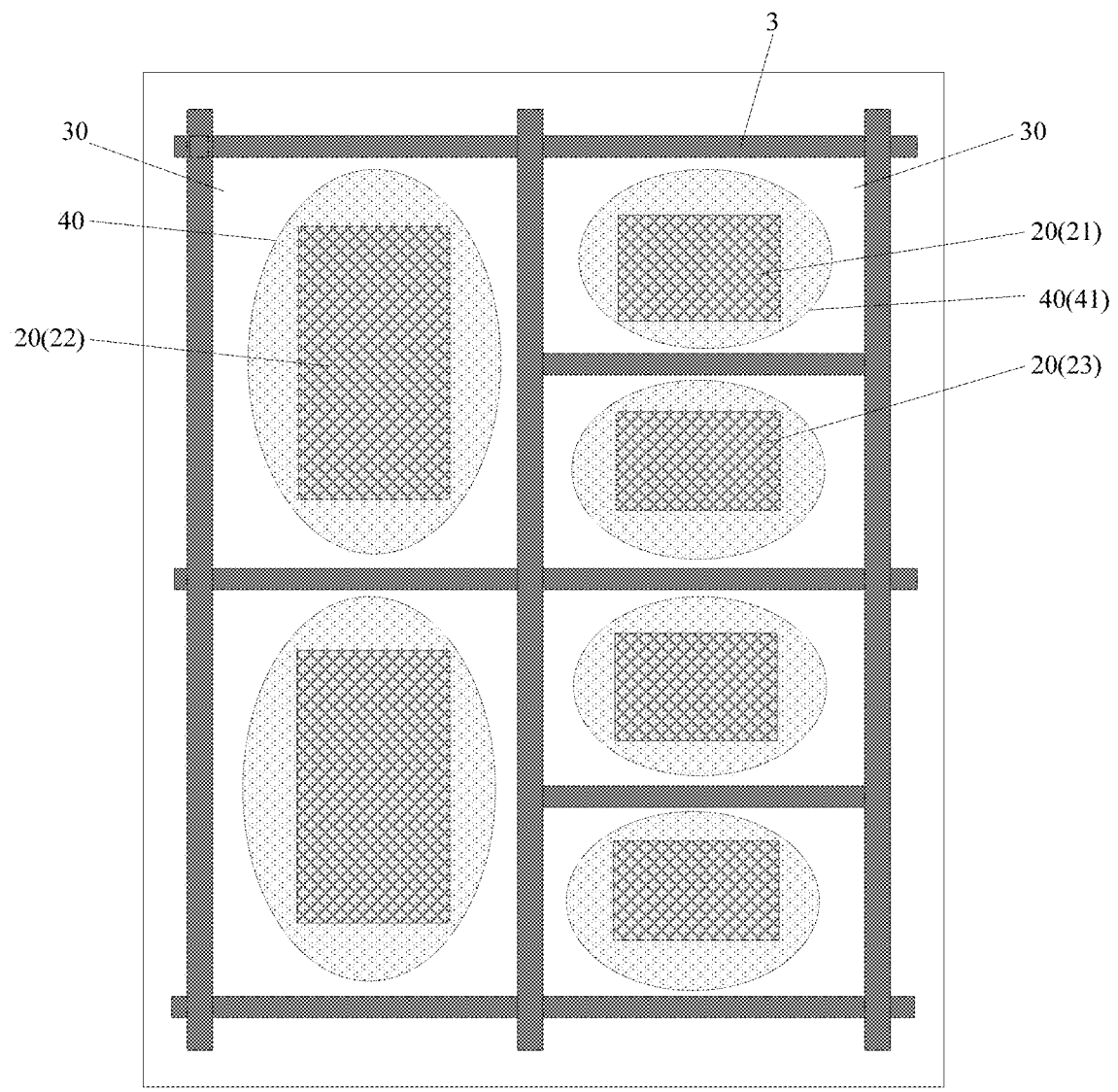
FIG. 1D is a fifth schematic diagram of a top view of a touch display panel provided in an embodiment of the present disclosure.
Figure 1E:
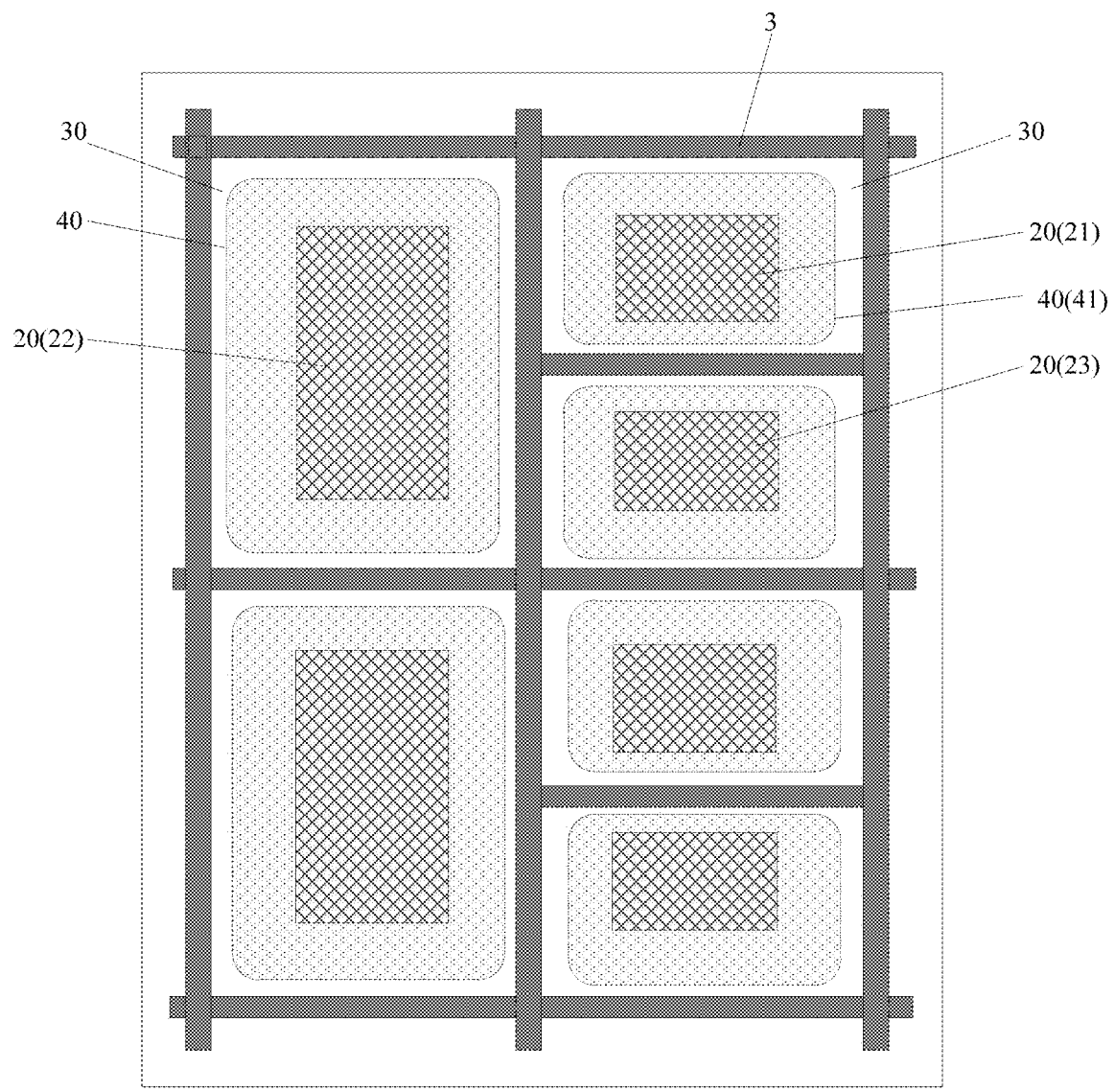
FIG. 1E is a fourth schematic diagram of a top view of a touch display panel provided in an embodiment of the present disclosure.

In a possible implementation, a shape of an orthographic projection of any one of the plurality of first light absorption patterns 40 on the base substrate 1 may be circular; or the orthographic projection of any one of the plurality of first light absorption patterns 40 on the base substrate 1 may be oval, as shown in FIG. 1D; or the orthographic projection of any one of the plurality of first light absorption patterns 40 on the base substrate 1 may be a quadrangle with arc-shaped corner, as shown in FIG. 1E. In the embodiments of the present disclosure, the orthographic projection of any one of the first light absorption patterns 40 on the base substrate 1 is circular or oval, or is the quadrangles with arc-shaped corner. In this way, the problems that two adjacent edges of two adjacent first light absorption patterns 40 form a structure similar to evenly spaced slits, and color separation of the touch display panel occurs due to interference and diffraction may be solved.

Figure 3:
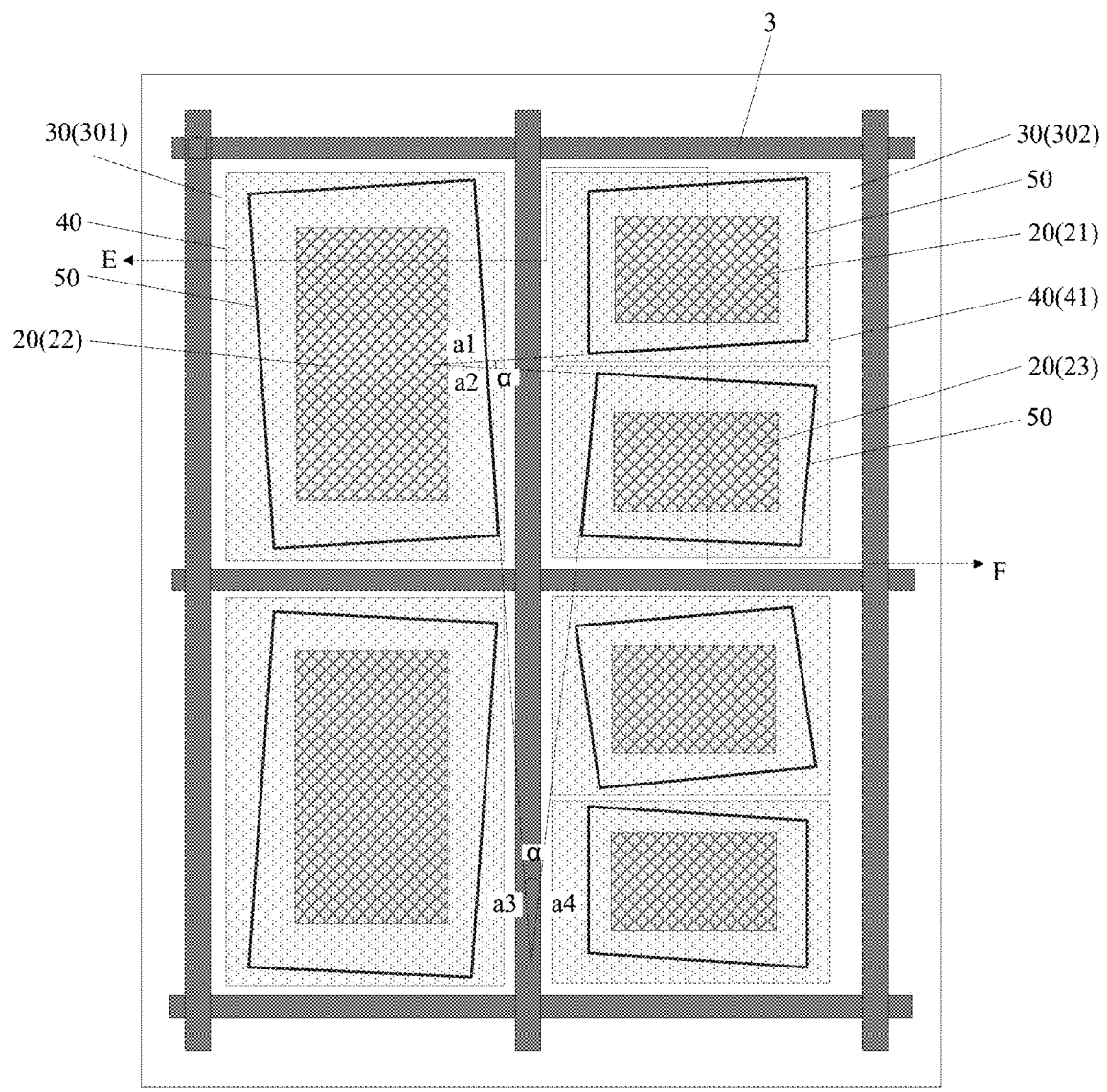
FIG. 3 is a sixth schematic diagram of a top view of a touch display panel provided in an embodiment of the present disclosure.
Figure 4A:
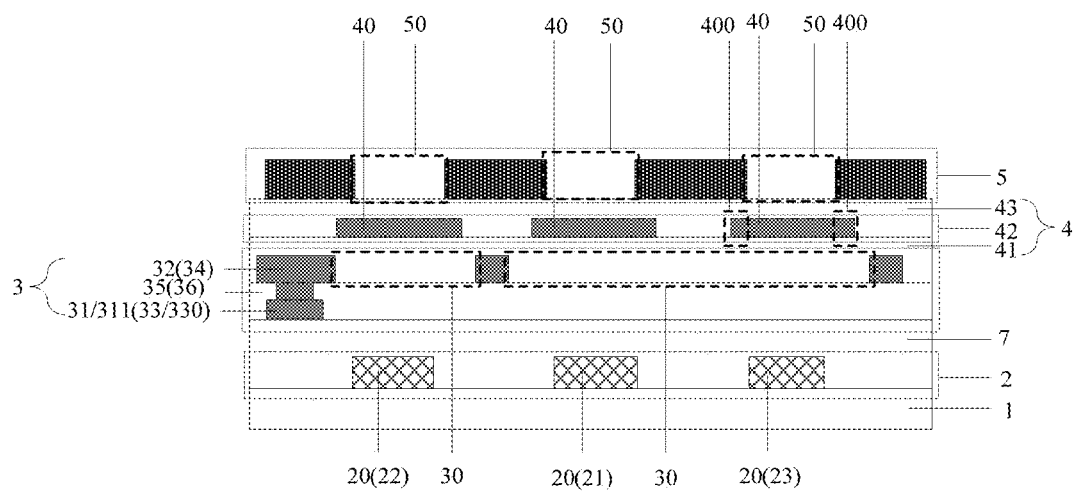
FIG. 4A is a schematic diagram of a section along a dotted line EF in FIG. 3.

In a possible implementation, with reference to FIGS. 3 and 4A, FIG. 4A is a schematic diagram of a section along a dotted line EF in FIG. 3. The touch display panel further includes a black matrix layer 5 arranged at a side of the reflection reducing structure layer 4 away from the touch structure layer 3, the black matrix layer 5 is provided with a plurality of black matrix openings 50 for exposing the plurality of pixels, the plurality of black matrix openings 50 correspond to the plurality of pixels 20 in a one-to-one correspondence, and each of the plurality of black matrix openings 50 exposes one pixel 20. Orthographic projections of the plurality of black matrix openings 50 on the base substrate 1 cover the orthographic projections of the plurality of pixels 20 on the base substrate 1, and the orthographic projections of the plurality of first light absorption patterns 40 on the base substrate 1 cover the orthographic projections of the plurality of black matrix openings 50 on the base substrate 1. That is, an area of the orthographic projections of the first light absorption patterns 40 on the base substrate 1 is larger than or equal to that of the orthographic projections of the black matrix openings 50 on the base substrate 1, and the orthographic projections of the black matrix openings 50 on the base substrate 1 are located in or overlap the orthographic projections of the first light absorption patterns 40 on the base substrate 1.

Figure 4B:
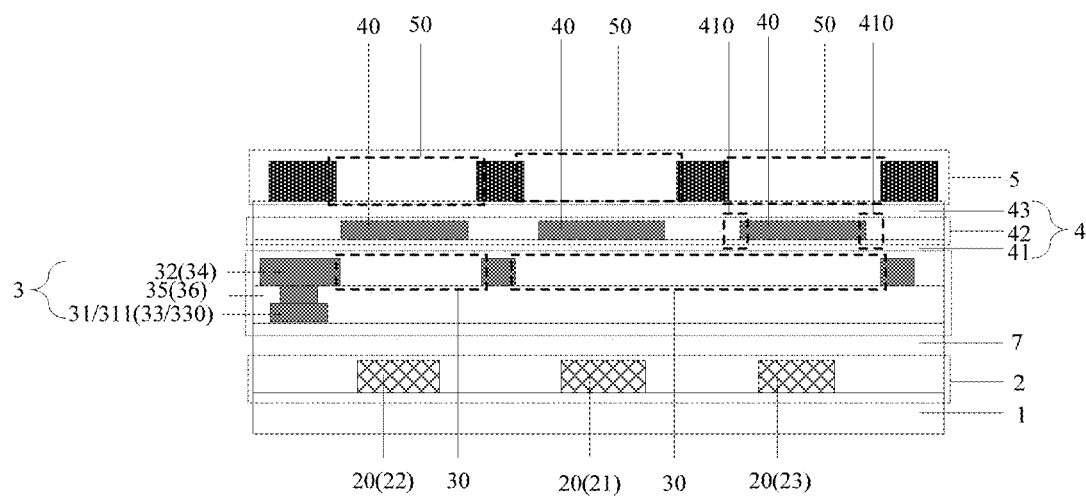
FIG. 4B is a schematic diagram of a section when black matrices do not cover edges of first light absorption patterns.

As shown in FIG. 4A, the black matrix layer 5 covers edges 400 of the first light absorption patterns 40. In this way, a gap between the black matrix layer and the first light absorption patterns is avoided. As shown in FIG. 4B, an electrode (such as a cathode) corresponding to a region 410 outside the first light absorption patterns 40 under an orthographic projection of a black matrix opening 50 cannot be subjected to reflection reducing. That is, the black matrix openings 50 are wide, and the black matrix openings 50 cannot effectively block reflection of metal in the region 410 outside the first light absorption patterns 40. The manufacturing process of the touch display panel is layered step-by-step preparation, and there is a horizontal alignment deviation between the layers. Therefore, to ensure that there is no gap between black matrix layer 5 and the first light absorption patterns 40, it is necessary to make the black matrix layer overlap with the first light absorption patterns during design, so as to reduce a gap risk caused by process alignment.

During specific implementation, a positional relation between the black matrix layer 5 and the reflection reducing structure layer 4 may be other positional relations. For example, the black matrix layer 5 may be integrated between the first light absorption layer 42 and the second insulation layer 43 in the reflection reducing structure layer 4. Further, both the black matrix layer 5 and the reflection reducing structure layer 4 may be integrated in a film packaging structure layer subsequently formed.

In a possible implementation, as shown in FIG. 3, extension lines of two adjacent edges of at least two adjacent black matrix openings 50 intersect each other. For example, a first pixel 21 is adjacent to a third pixel 23, an extension line of an edge, adjacent to the black matrix opening 50 corresponding to the third pixel 23, of the black matrix opening 50 corresponding to the first pixel 21 is a1, an extension line of an edge, adjacent to the black matrix openings 50 corresponding to the first pixels 21, of the black matrix opening 50 corresponding to the third pixel 23 is a2, and a1 intersects a2. Further, the black matrix opening 50 corresponding to the second pixel 22 is adjacent to the black matrix opening 50 corresponding to the third pixel 23, an extension line of an edge, adjacent to the black matrix opening 50 corresponding to the third pixel 23, of the black matrix opening 50 corresponding to the second pixel 22 is a3, an extension line of an edge, adjacent to the black matrix opening 50 corresponding to the second pixel 22, of the black matrix opening 50 corresponding to the third pixel 23 is a4, and a3 intersects a4. In the embodiments of the present disclosure, the extension lines of two adjacent edges of at least two adjacent black matrix openings 50 intersect each other. In this way, interference and diffraction of adjacent reflected light of an identical cycle may be avoided, and the problems that two adjacent edges of two adjacent black matrix openings 50 form a structure similar to evenly spaced slits, and color separation of the touch display panel occurs due to interference and diffraction may be solved.

In a possible implementation, as shown in FIG. 3, any one of the plurality of black matrix openings 50 includes at least one straight edge, and straight edges facing the same direction of adjacent black matrix openings 50 are not parallel to each other. For example, in FIG. 3, the black matrix openings 50 are quadrilateral, and for two black matrix openings 50 at an upper right side, left sides of two black matrix openings 50 face a vertical direction, and are not parallel to each other. Specifically, an acute angle α formed by extension lines of two adjacent edges of adjacent black matrix openings 50 ranges from 5 degrees to 60 degrees. Specifically, an acute angle α formed by extension lines of two adjacent edges of adjacent black matrix openings 50 ranges from 10 degrees to 60 degrees. Specifically, an acute angle α formed by extension lines of two adjacent edges of adjacent black matrix openings 50 ranges from 5 degrees to 30 degrees. In this way, while a color separation problem is solved, the problem that adjacent black matrix openings 50 intersect at a short distance so that a pixel region cannot be defined is solved.

Figure 5:
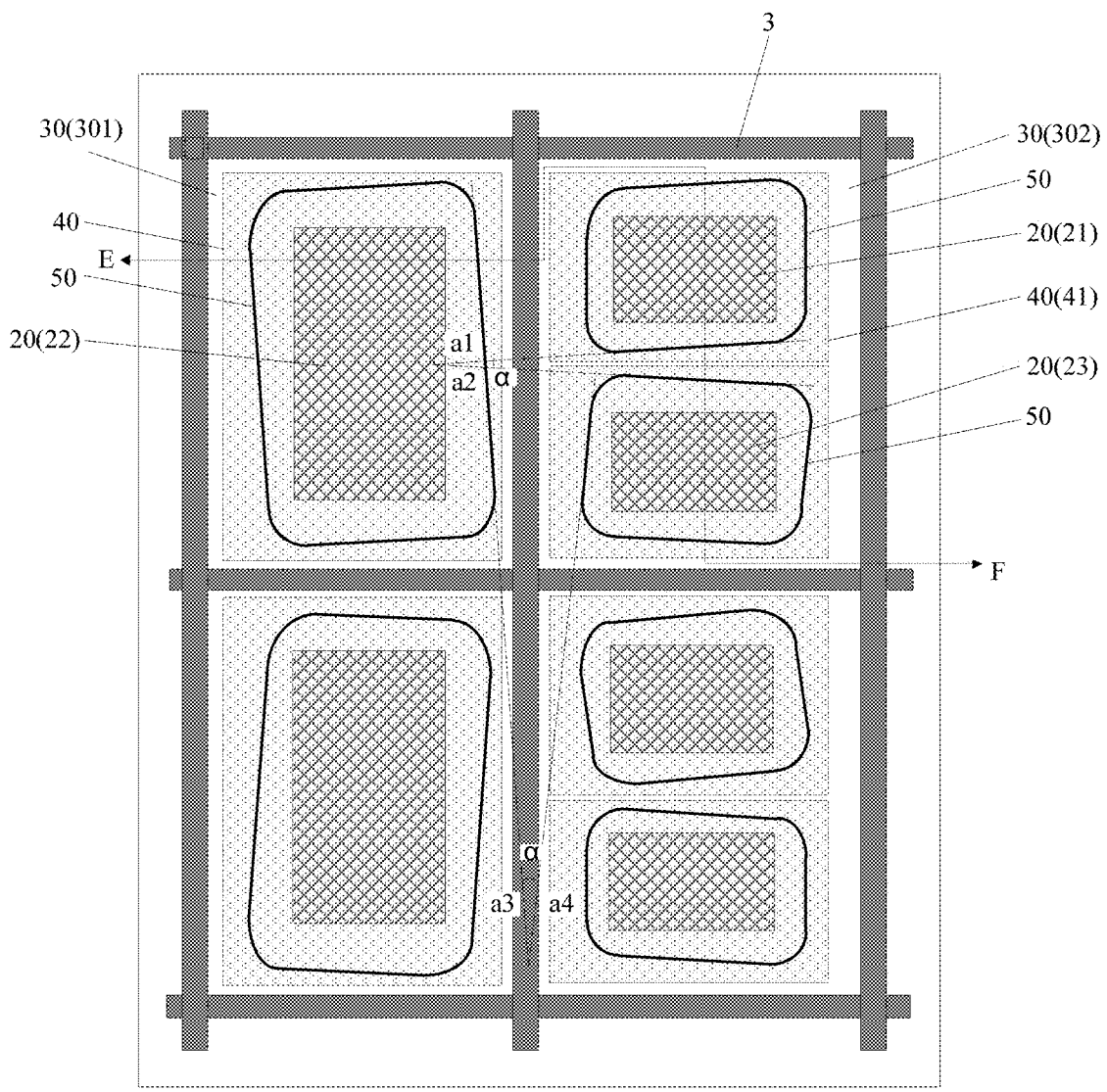
FIG. 5 is a seventh schematic diagram of a top view of a touch display panel provided in an embodiment of the present disclosure.

In a possible implementation, with reference to FIG. 5, at least one corner of any one of the black matrix openings 50 includes an arc-shaped corner. In this way, a problem of color separation of the touch display panel may be further solved.

Figure 6:
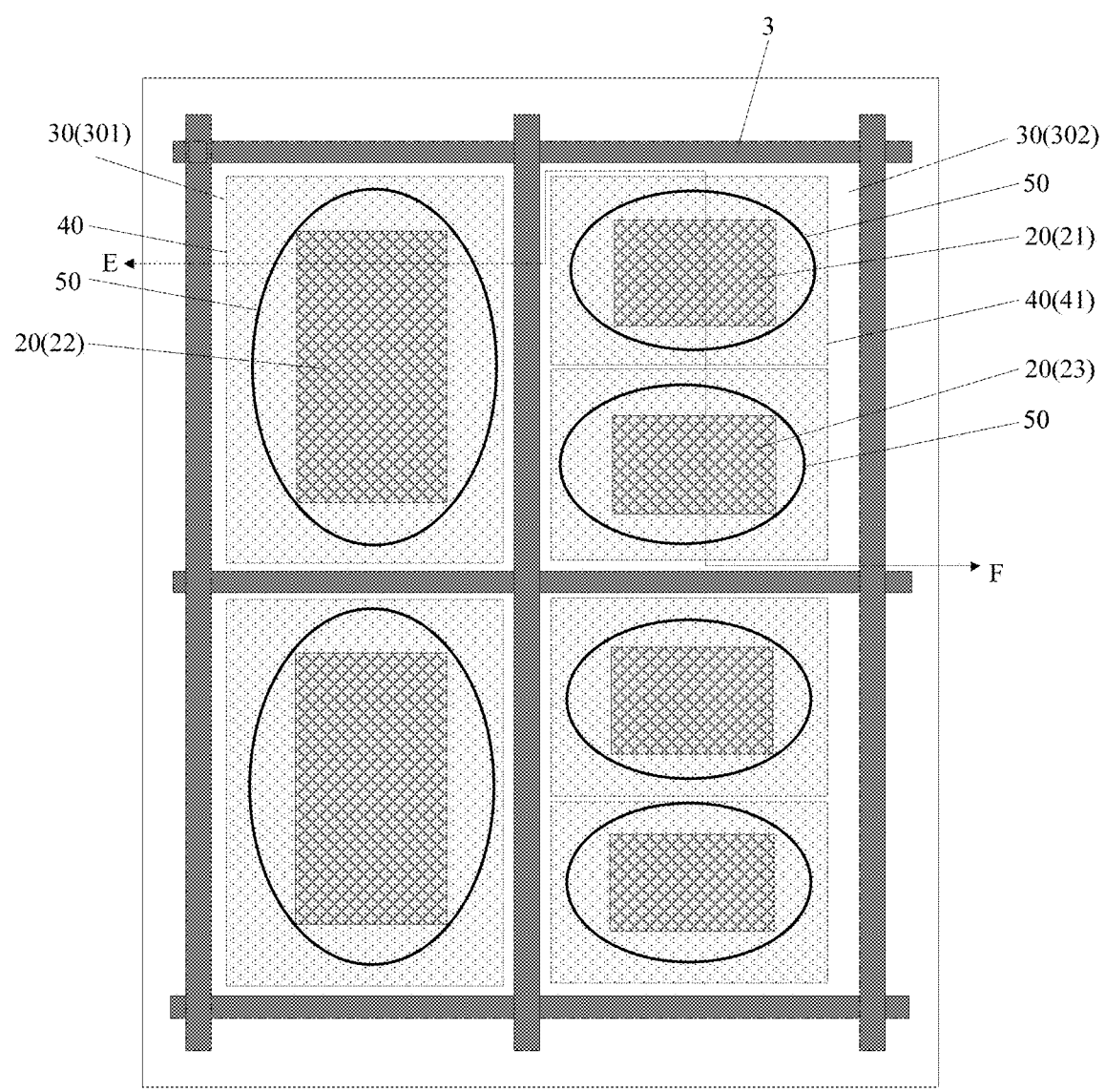
FIG. 6 is an eighth schematic diagram of a top view of a touch display panel provided in an embodiment of the present disclosure.

In a possible implementation, with reference to FIG. 6, a shape of an orthographic projection, on the base substrate 1, of any one of the plurality of black matrix openings 50 may be oval. In the embodiments of the present disclosure, a shape of an orthographic projection, on the base substrate, of any one of the plurality of black matrix opening is circular or oval. In this way, the interference and diffraction of adjacent reflected light of the consistent cycle may be further avoided, and the problem of color separation of the touch display panel may be solved.

Figure 7:
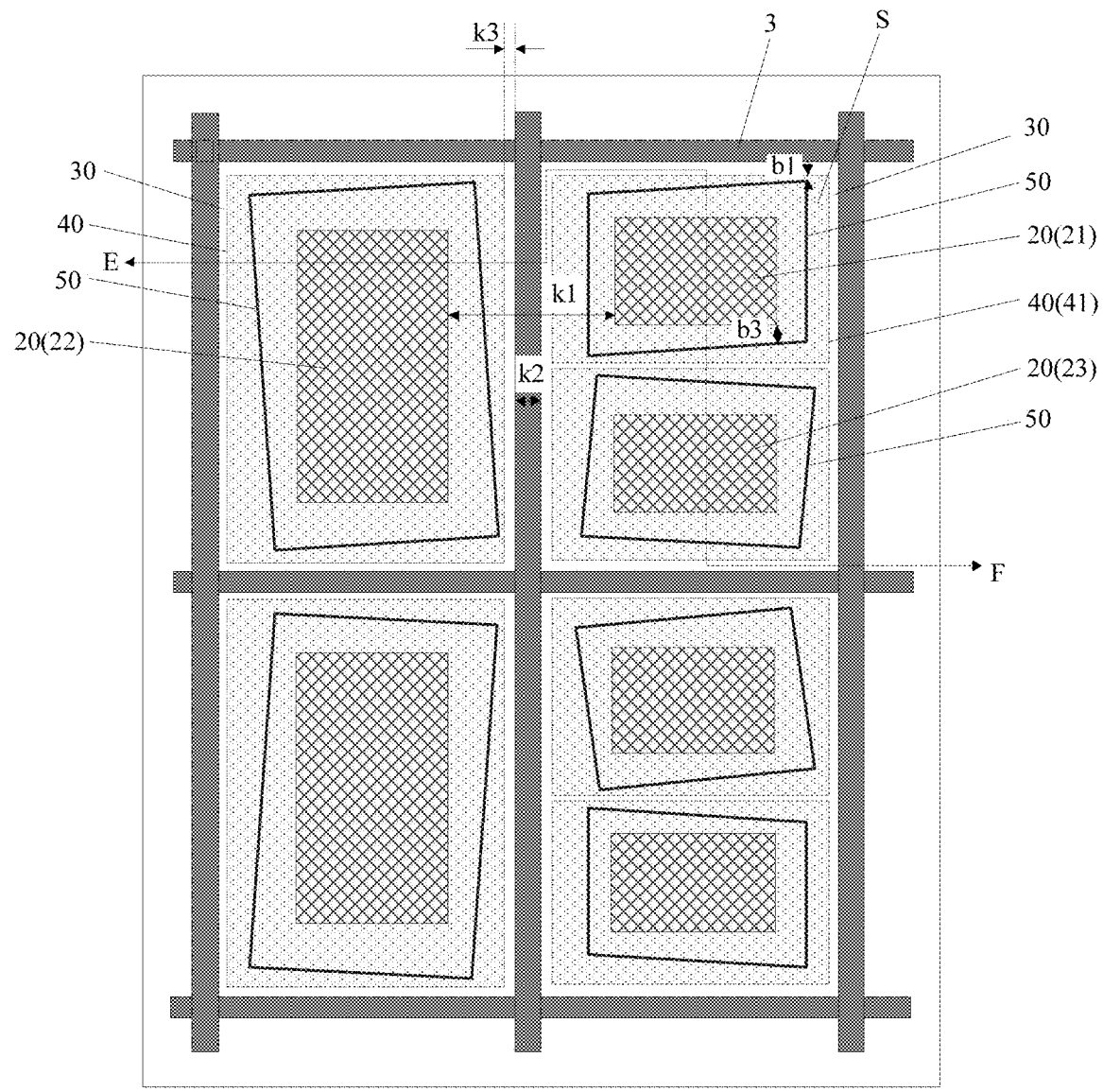
FIG. 7 is a ninth schematic diagram of a top view of a touch display panel provided in an embodiment of the present disclosure.
Figure 8:
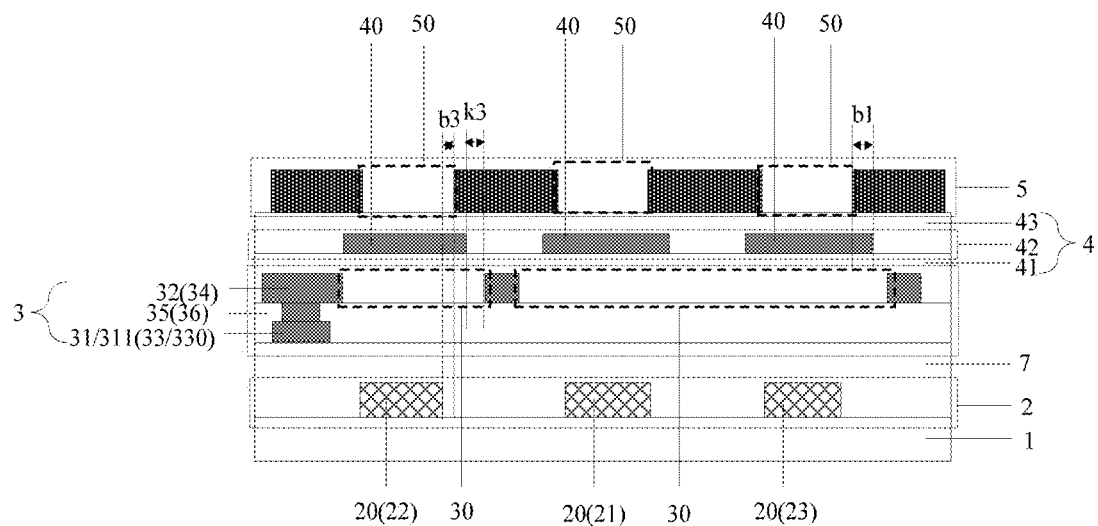
FIG. 8 is a schematic diagram of a section along a dotted line EF in FIG. 7.

In a possible implementation, with reference to FIGS. 7 and 8, an overlapping region S (which is a region in a first light absorption pattern 40 outside the black matrix opening 50 in FIG. 7) exists between an orthographic projection of the first light absorption pattern 40 on the base substrate 1 and black matrices at edges of a black matrix opening 50, and an area of the overlapping region S account for 0%-40% of an area of the orthographic projection of the first light absorption pattern 40 on the base substrate 1 in area. In this way, during actual manufacturing, under the condition of process deviation, it is ensured that the black matrices may still cover the first light absorption patterns 40. Specifically, the overlapping regions S account for 0%-20% of the orthographic projections of the first light absorption patterns 40 on the base substrate 1. Specifically, an area of the overlapping regions S account for 0%-10% of an area of the orthographic projection of the first light absorption pattern 40 on the base substrate 1. The overlapping regions S account for 5%-15% of the orthographic projections of the first light absorption patterns 40 on the base substrate 1 in area. A minimum size b1 of the overlapping regions S is larger than 0.5 m. Specifically, as shown in FIG. 7, the orthographic projections of the first light absorption pattern 40 on the base substrate 1 has the overlapping region S with the black matrices at the edges of the black matrix opening 50, the overlapping region S may be annular, and the minimum size b1 of the overlapping region S may be understood as a size at a narrowest position of an annular shape.

In a possible implementation, as shown in FIGS. 7 and 8, a maximum distance k3 between an edge of a touch opening 30 and an edge of a first light absorption patterns 40 satisfies a following formula:

$$k3=(k1-k2)/2,$$

where k1 represents a maximum distance between two adjacent pixels 20, and k2 represents a minimum width of a touch line. For example, the two adjacent pixels 20 have a distance k1 ranging from 18 μm to 25 μm and a width of touch line k2 ranging from 3 μm to 5 μm, so k3=(25−3)÷2=11. That is, the first light absorption pattern 40 gradually shrink, and when the first light absorption patterns coincide with the pixels 20, distances between the edge of the touch opening 30 and the edge of the first light absorption pattern 40 is the largest, and satisfy the above relational expression. In this way, under the condition that reflectivity of the touch display panel to external light is minimized, influence of the first light absorption patterns 40 on a touch function of the touch structure layer 3 is low.

Figure 9A:
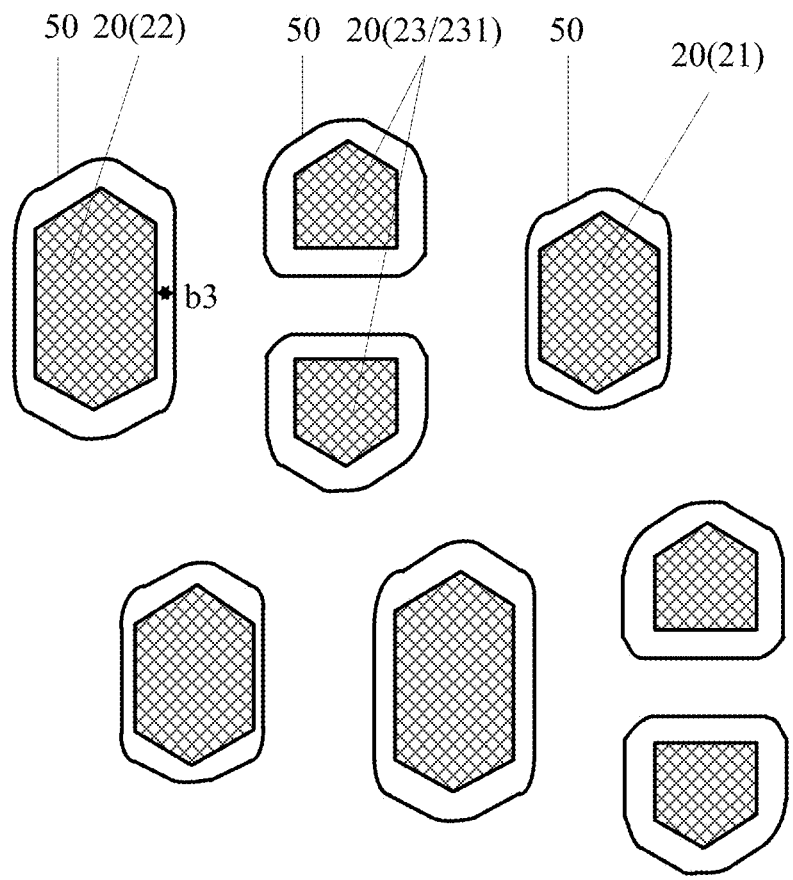
FIG. 9A is a first schematic diagram of black matrix openings provided in an embodiment of the present disclosure.
Figure 9B:
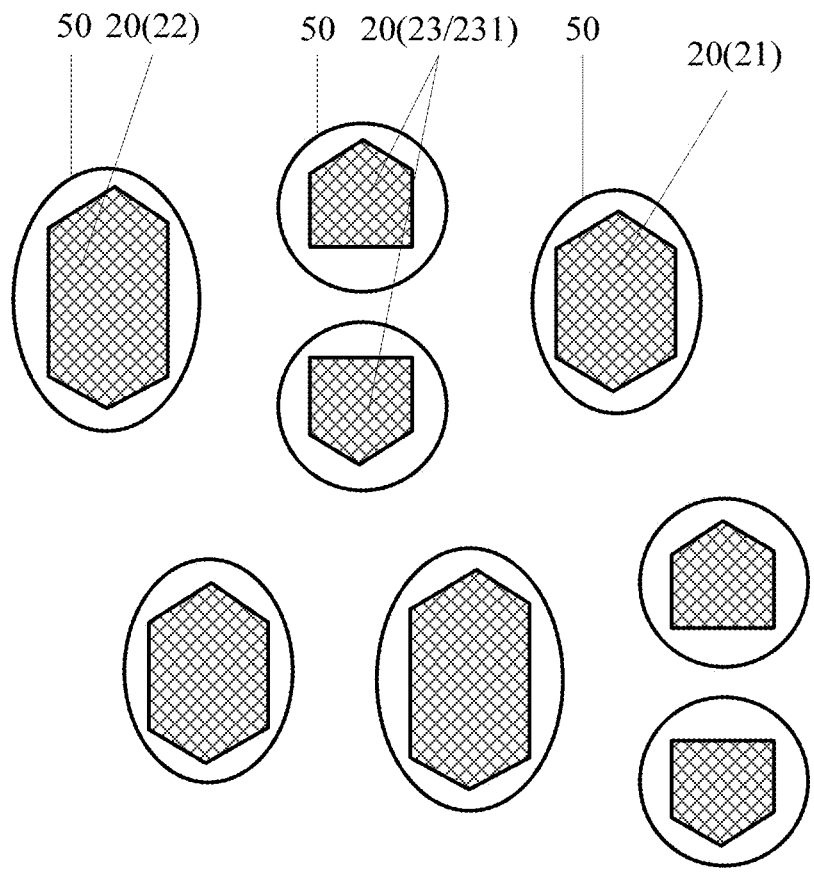
FIG. 9B is a second schematic diagram of black matrix openings provided in an embodiment of the present disclosure.

It should be noted that FIGS. 1A-8 provide illustrative description with an arrangement and distribution mode in which the area of the orthographic projection of the second pixel 22 on the base substrate is larger than the area of the orthographic projection of the first pixel 21 on the base substrate, the area of the orthographic projection of the second pixel 22 on the base substrate is larger than the area of the orthographic projection of the third pixel 23 on the base substrate, the first pixel 21, the second pixel 22, and the third pixel 23 are quadrilateral, and the first pixel 21 and the third pixel 23 are located on a side of the second pixel 22. During specific implementation, an arrangement and distribution mode of the pixels of the touch display panel may also be other modes. For example, as shown in FIGS. 9A and 9B, the first pixel 21, the second pixel 22 may be hexagonal, the third pixel 23 may include two pentagonal third sub-pixels 231, the second pixel 22 and the first pixel 21 are located on two sides of the third pixel 23 respectively, and a shape of the black matrix opening 50 is consistent with a shape of a corresponding pixel. In the arrangement and distribution mode of the pixels, corners of the black matrix openings 50 may include an arc-shaped corner, as shown in FIG. 9A, or the orthographic projection of the black matrix opening 50 on the base substrate 1 may be circular or oval. For example, the black matrix openings 50 corresponding to two third sub-pixels 231 may be circular, the black matrix openings 50 corresponding to the first pixels 21 may be oval, and the black matrix openings 50 corresponding to the second pixels 22 may be oval.

It should be noted that, to more clearly illustrate the arrangement and distribution mode of the pixels and the shapes of the black matrix openings 50, FIGS. 9A and 9B do not show other structures, which do not limit the embodiments of the present disclosure. During specific implementation, the touch display panel may still be provided with, for example, the touch structure layer 3 and the reflection reducing structure layer 4.

In a possible implementation, with reference to FIGS. 7, 8 and 9A, a minimum distance b3 between an edge of the black matrix opening 50 and an edge of the pixel 20 may be a value when the edge of the black matrix opening 50 coincide with the edge of the pixel 20, that is, 0; and the minimum distance b3 between the edge of the black matrix opening 50 and the edge of the pixel 20 may be a value when the black matrix opening 50 coincide with the pixel 20. A maximum distance b3 between the edge of the black matrix opening 50 and the edge of the pixel 20 satisfies the following relational expression:

$$b3=(k1-k2)/2,$$

where k1 represents the maximum distance between the two adjacent pixels 20, and k2 represents the minimum width of a touch line.

For example, the pixels 20 have a distance k1 ranging from 18 μm to 25 μm and a width of the touch line k2 ranging from 3 μm to 5 μm, so k3=(25−3)÷2=11. Specifically, distances b3 between the edge of the black matrix opening 50 and the edge of the pixel 20 may be 0 μm to 11 μm; the minimum distance b3 between the edge of the black matrix opening 50 and the edge of the pixel 20 may be 2 μm to 8 μm; and the minimum distance b3 between the edge of the black matrix opening 50 and the edge of the pixel 20 may be 2 μm, 3 μm, 4 μm or 5 μm.

As shown in FIG. 2, a buffer layer 7 may also be arranged between the display structure layer 2 and the touch structure layer 3. A material of the buffer layer 7 may include silicon nitride.

Figure 10:
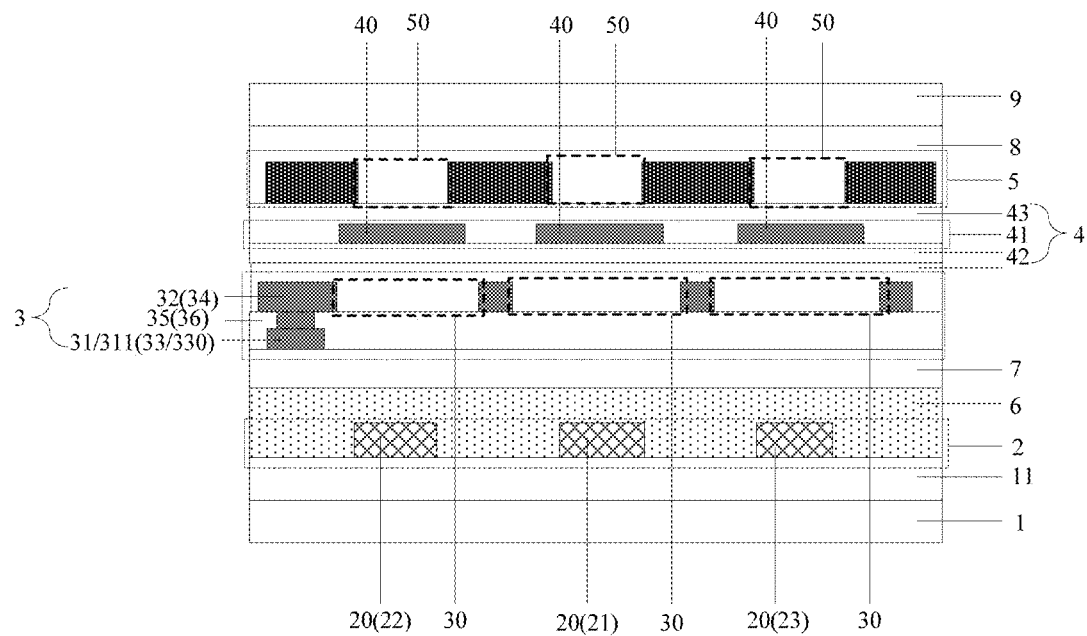
FIG. 10 is a schematic diagram of another section along the dotted line EF in FIG. 7.

In a possible implementation, with reference to FIG. 10, the touch display panel further includes a film packaging structure layer 6 arranged between the display structure layer 2 and the touch structure layer 3. Specifically, the film packaging structure layer 6 may be arranged between the display structure layer 2 and the buffer layer 7, and the film packaging structure layer 6 includes a first inorganic packaging layer, an organic packaging layer and a second inorganic packaging layer that are sequentially laminated. In this way, packaging of the touch structure layer 2 is achieved.

In a possible implementation, with reference to FIG. 10, the touch display panel further includes an organic protective layer 8 arranged at a side of the black matrix layer 5 away from the touch structure layer 4. Specifically, a material of the organic protective layer 8 may include optically clear adhesive. Specifically, the organic protective layer 8 may be drilled at positions corresponding to the pixels 20, and lenses are formed at the drilled positions.

In a possible implementation, with reference to FIG. 10, the touch display panel further includes a third inorganic insulation layer 9 arranged at a side of the organic protective layer facing away from the touch structure layer. Materials of the third inorganic insulation layer 9 include at least one of silicon oxide, silicon nitride, or silicon oxynitride. In this way, the reflectivity of the touch display panel to the external light may be further reduced.

Figure 11:
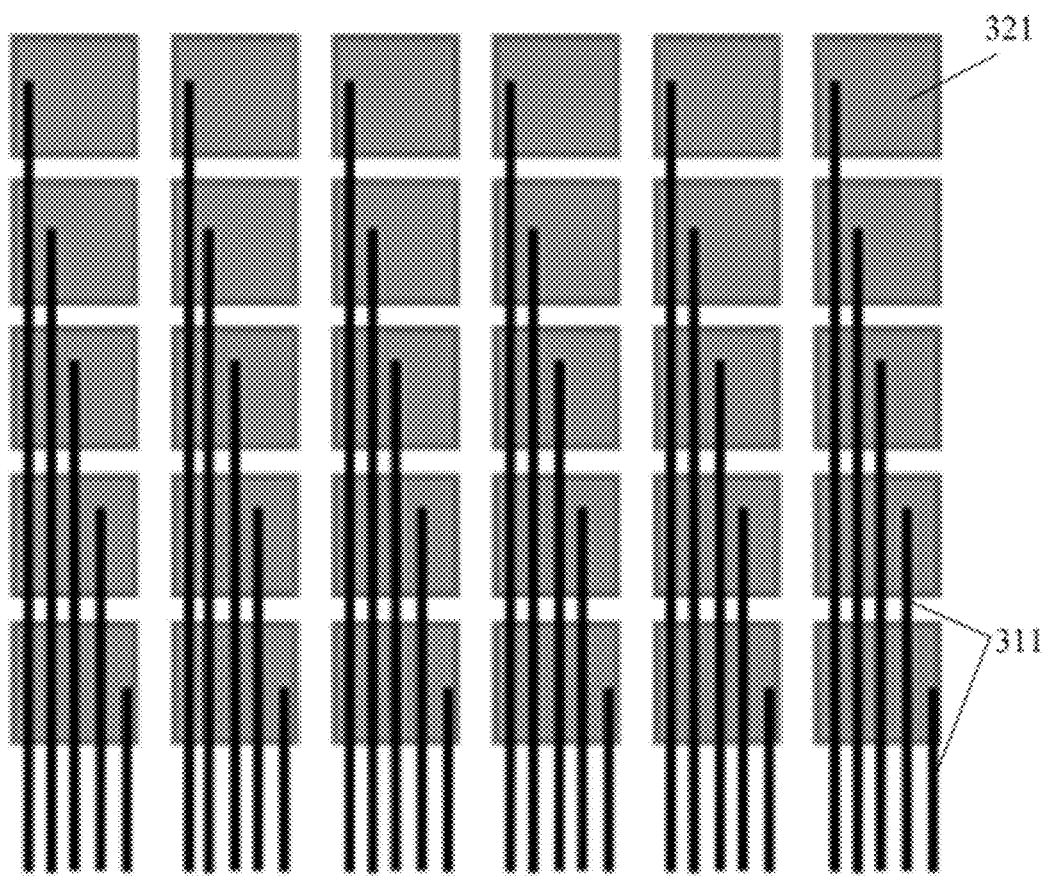
FIG. 11 is a tenth schematic diagram of a top view of a touch display panel provided in an embodiment of the present disclosure.

In a possible implementation, with reference to FIGS. 10 and 11, the touch structure layer 3 includes a first touch metal sub-layer 31, a second touch metal sub-layer 32 arranged at a side of the first touch metal sub-layer 31 facing away from the display structure layer 2, and a first touch insulation layer 35 arranged between the first touch metal sub-layer 31 and the second touch metal sub-layer 32. The second touch metal sub-layer 32 may include a plurality of first touch electrode blocks 321, and each of the first touch electrode blocks 321 includes the plurality of touch openings 30. The first touch metal sub-layer 31 includes a plurality of first touch leads 311 corresponding to the first touch electrode blocks 321 one to one, and each of the plurality of first touch leads 311 is electrically connected to a corresponding first touch electrode block 321 through a via hole K penetrating the first touch insulation layer 35.

It should be noted that, to illustrate an overall structure of the touch structure layer, FIG. 11 does not show the touch openings 30, which does not limit the present disclosure. Specifically, a schematic diagram of the touch openings 30 included in each of the first touch electrode blocks 321 may be shown in conjunction with FIGS. 1A-8.

Figure 12:
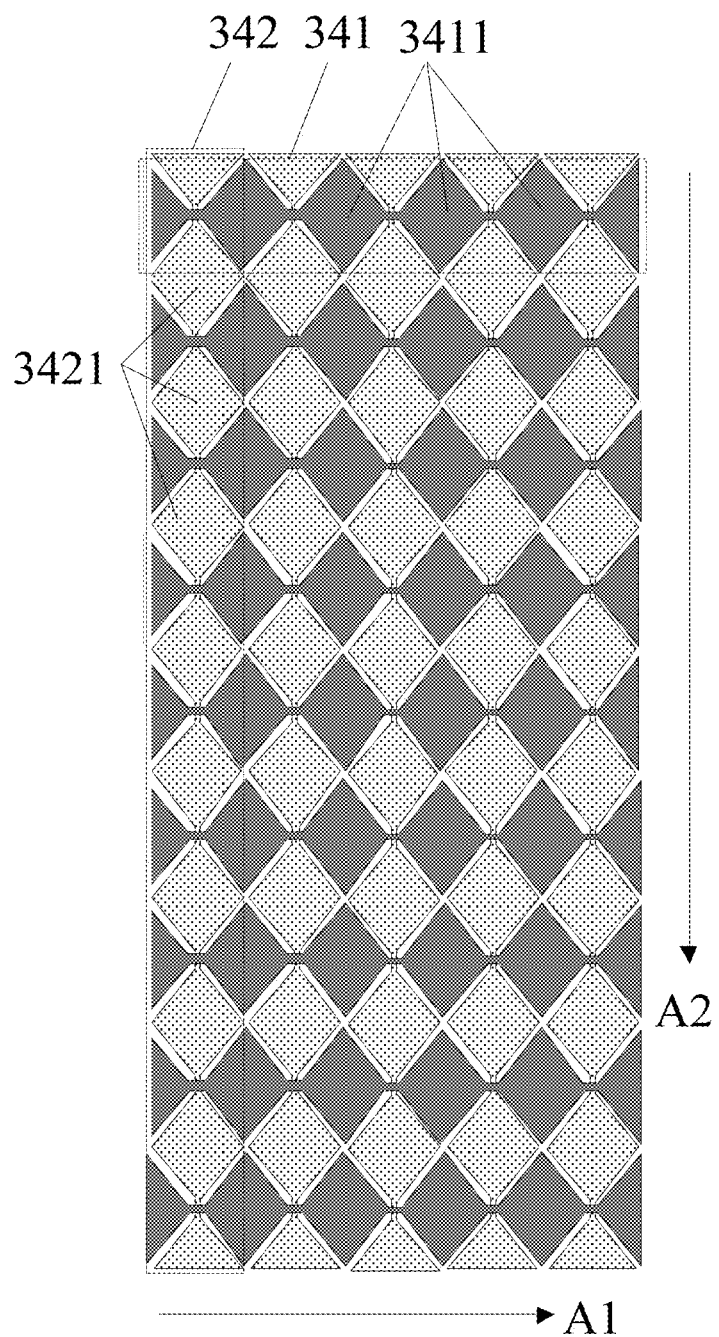
FIG. 12 is an eleventh schematic diagram of a top view of a touch display panel provided in an embodiment of the present disclosure.

In a possible implementation, with reference to FIGS. 10 and 12, the touch structure layer 3 includes a third touch metal sub-layer 33, a fourth touch metal sub-layer 34 arranged at a side of the third touch metal sub-layer 33 facing away from the display structure layer 2, and a second touch insulation layer 36 arranged between the third touch metal sub-layer 33 and the fourth touch metal sub-layer 34. The fourth touch metal sub-layer 34 includes a plurality of first touch electrode strips 341 extending in a first direction A1 and a plurality of second touch electrode strips 342 extending in a second direction A2; any one of the plurality of first touch electrode strips 341 includes a plurality of second touch electrode blocks 3411 that are electrically connected integrally, and any one of the plurality of second touch electrode strips 342 includes a plurality of third touch electrode blocks 3421. Any one of the plurality of second touch electrode blocks 3411 includes the plurality of touch openings 30, and any one of the plurality of third touch electrode blocks 3421 includes the plurality of touch openings 30. The third touch metal sub-layer 33 includes a plurality of bridging parts 330, and two adjacent third touch electrode blocks 3421 are electrically connected by means of a corresponding bridging part 330 of the plurality of bridging parts 330.

It should be noted that, to illustrate the overall structure of the touch structure layer, FIG. 12 do not show the touch openings 30, which do not limit the present disclosure. Specifically, a schematic diagram of the touch openings 30 included in each of the second touch electrode blocks 3411 and the touch openings 30 included in each of the third touch electrode blocks 3421 may be shown in conjunction with FIGS. 1A-8.

In a possible implementation, materials of the first insulation layer 41 include at least one of silicon oxide, silicon nitride, or silicon oxynitride. Materials of the second insulation layer 43 include at least one of silicon oxide, silicon nitride, or silicon oxynitride.

Figure 13:
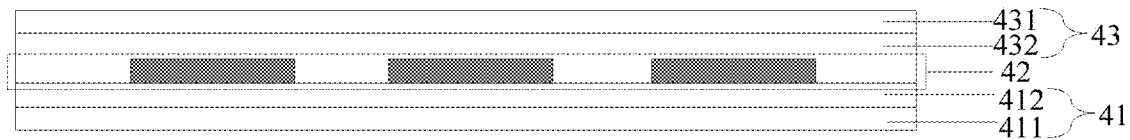
FIG. 13 is a first schematic diagram of a touch structure layer provided in an embodiment of the present disclosure.

In a possible implementation, with reference to FIG. 13, the first insulation layer 41 includes a first inorganic insulation sub-layer 411, and a second inorganic insulation sub-layer 412 arranged on a side of the first inorganic insulation sub-layer 421 facing the first light absorption layer 42. A material of the second inorganic insulation sub-layer 412 includes silicon nitride, and a material of the first inorganic insulation sub-layer 411 includes silicon oxide. The second inorganic insulation sub-layer 412 formed from silicon nitride may have desirable compactness, and is capable of protecting the first light absorption layer 42, and the first inorganic insulation sub-layer 421 formed from silicon oxide may have low reflectivity, and is capable of reducing reflectivity.

In a possible implementation, with reference to FIG. 13, the second insulation layer 43 includes a third inorganic insulation sub-layer 431, and a fourth inorganic insulation sub-layer 432 arranged on a side of the third inorganic insulation sub-layer 431 facing the first light absorption layer 42. A material of the fourth inorganic insulation sub-layer 432 includes silicon nitride, and a material of the third inorganic insulation sub-layer 431 includes silicon oxide. The fourth inorganic insulation sub-layer 432 formed from silicon nitride may have desirable compactness, and is capable of protecting the first light absorption layer 42, and the third inorganic insulation sub-layer 431 formed from silicon oxide may have low reflectivity, and is capable of reducing reflectivity.

Figure 14:
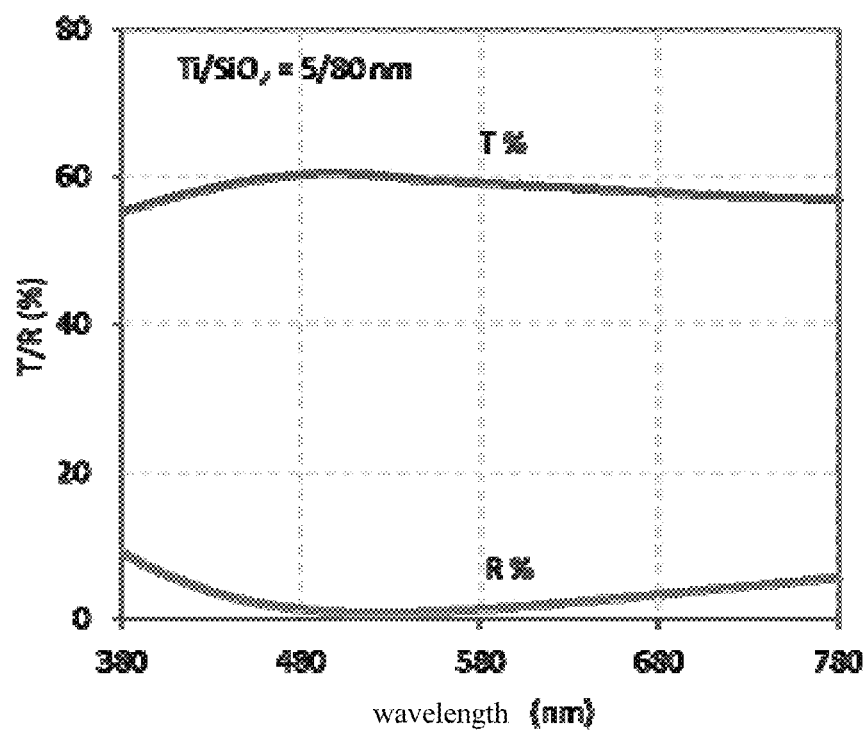
FIG. 14 is a schematic diagram of light transmission and reflection of a touch structure layer provided in an embodiment of the present disclosure.

In a possible implementation, with reference to FIG. 14, the reflection reducing structure layer 4 has a transmittance T ranging from 40% to 60% and a reflectivity R ranging from 0% to 10%. Specifically, in wavelengths of 380 nm-780 nm, in the embodiments of the present disclosure, a range of the reflectivity R of the reflection reducing structure layer 4 may be kept to be low, thereby achieving a better reflection reducing effect.

In a possible implementation, a thickness of the first light absorption layer 42 accounts for 0.1%-10% of that of the reflection reducing structure layer 4. Specifically, the thickness of the first light absorption layer 42 accounts for 1%-10% of that of the reflection reducing structure layer 4. The thickness of the first light absorption layer 42 accounts for 2%-7% of that of the reflection reducing structure layer 4. The thickness of the first light absorption layer 42 accounts for 3%, 4%, 5% or 6% of that of the reflection reducing structure layer 4. Specifically, reflection of the first light absorption layer 42 is related to the thickness, a reflection characteristic is shown when the thickness is large, so the thickness of the first light absorption layer 42 needs to be controlled to achieve an absorption effect. In the embodiments of the present disclosure, the thickness of the first light absorption layer 42 accounts for 0.1%-10% of that of the reflection reducing structure layer 4. In this way, the first light absorption layer 42 may have high light absorption performance and low reflection performance. Specifically, if one layer of metal is not enough to achieve a required absorption value, the first light absorption layer 42 may include a plurality of metal sub-layers and inorganic insulation layers arranged between adjacent metal sub-layers, and the metal sub-layers and the inorganic insulation layers are alternately arranged, so as to achieve the high light absorption performance and low reflection performance.

In a possible implementation, a thickness of the first light absorption layer 42 ranges from 10 A to 250 A. In this way, the external light may be absorbed to a certain extent, and meanwhile, light generated by the pixels 20 may also be transmitted, so as to avoid influencing display of the touch display panel.

In a possible implementation, a material of the first light absorption layer 42 may include Ti, Mo, Cu, Al or Ag.

Based on the same inventive concept, the embodiments of the present disclosure further provide a display device, which includes the touch display panel provided in the embodiments of the present disclosure.

The embodiments of the present disclosure have the beneficial effects: in the embodiments of the present disclosure, the touch display panel includes the touch structure layer 3 arranged at a side of the display structure layer 2 away from the base substrate 1 and the reflection reducing structure layer 4 arranged at a side of the touch structure layer 3 away from the display structure layer 2. The reflection reducing structure layer 4 includes the plurality of first light absorption patterns 40 corresponding to the touch openings 30 one to one, the first light absorption patterns 40 are capable of absorbing light incident on the region where the pixels 20 are located and reducing re-reflection of the light incident on the region where the pixels 20 are located, and may replace a circular polarizer. In this way, compared with a display panel to which a touch screen and the circular polarizer are bonded with glue, the embodiments of the present disclosure integrate the touch structure layer 3 and the reflection reducing structure layer 4 at a side of the display structure layer 2, thereby achieving a touch function, reducing external light reflection, reducing an overall thickness of the touch display panel and achieving an optimal repetitive foldability. In addition, in the embodiments of the present disclosure, the orthographic projections of the plurality of touch openings 30 on the base substrate 1 cover the orthographic projections of the plurality of first light absorption patterns 40 on the base substrate 1, and the problem that touch electrode blocks of the touch structure layer 3 overlap with the first light absorption patterns 40 to form overlap capacitance, resulting in failure of the touch structure layer 3 and no touch function may be solved.

Apparently, those skilled in the art may make various modifications and variations to the present disclosure without departing from the spirit and scope of the present disclosure. In this way, if the modifications and variations of the present disclosure fall within the scope of the claims of the present disclosure and their equivalent technologies, the present disclosure is also intended to include the modifications and variations.

What is claimed is:
1. A touch display panel, comprising:
a base substrate;
a display structure layer, arranged at a side of the base substrate, and having a plurality of pixels;
a touch structure layer, arranged at a side of the display structure layer away from the base substrate, and comprising a plurality of touch openings exposing the plurality of pixels;
a reflection reducing structure layer, arranged at a side of the touch structure layer away from the display structure layer, and comprising a first insulation layer, a first light absorption layer and a second insulation layer that are laminated, wherein the first light absorption layer comprises a plurality of first light absorption patterns corresponding to the plurality of touch openings; and a black matrix layer, arranged on a side of the reflection reducing structure layer facing away from the touch structure layer, wherein the black matrix layer is provided with a plurality of black matrix openings for exposing the plurality of pixels, and the plurality of black matrix openings correspond to the plurality of pixels in a one-to-one correspondence;

wherein orthographic projections of the plurality of first light absorption patterns on the base substrate cover orthographic projections of the plurality of black matrix openings on the base substrate, and the orthographic projections of the plurality of black matrix openings on the base substrate cover orthographic projections of the plurality of pixels on the base substrate.

2. The touch display panel according to claim 1, wherein orthographic projections of the plurality of touch openings on the base substrate cover the orthographic projections of the plurality of first light absorption patterns on the base substrate.

3. The touch display panel according to claim 1, wherein extension lines of two adjacent edges of at least two adjacent black matrix openings intersect each other.

4. The touch display panel according to claim 3, wherein any one of the plurality of black matrix openings comprises at least one straight edge, and straight edges facing a same direction of adjacent black matrix openings are not parallel to each other.

5. The touch display panel according to claim 3, wherein at least one corner of any one of the plurality of black matrix openings comprises an arc-shaped corner.

6. The touch display panel according to claim 1, wherein a shape of an orthographic projection, on the base substrate, of any one of the plurality of black matrix opening is circular or oval.

7. The touch display panel according to claim 6, wherein an overlapping region exists between an orthographic projection of a first light absorption pattern on the base substrate and black matrices at edges of a black matrix opening, and an area of the overlapping region account for 0%-40% of an area of the orthographic projection of the first light absorption pattern on the base substrate.

8. The touch display panel according to claim 2, wherein a maximum distance k3 between an edge of a touch opening and a corresponding edge of a first light absorption pattern satisfies a following formula:

$$k3=(k1-k2)/2,$$

wherein k1 represents a maximum distance between two adjacent pixels, and k2 represents a minimum width of a touch line.

9. The touch display panel according to claim 2, wherein the plurality of pixels comprise a first pixel, a second pixel and a third pixel, an area of an orthographic projection of the second pixel on the base substrate is larger than an area of an orthographic projection of the first pixel on the base substrate, and the area of the orthographic projection of the second pixel on the base substrate is larger than an area of an orthographic projection of the third pixel on the base substrate;

the plurality of touch openings comprise a plurality of first touch openings and a plurality of second touch openings;

one of the plurality of first touch openings exposes a corresponding second pixel, and an orthographic projection of a first touch opening on the base substrate covers an orthographic projection of the corresponding second pixel on the base substrate; and one of the plurality of second touch openings exposes a corresponding first pixel and a corresponding third pixel, and an orthographic projection of a second touch opening on the base substrate covers an orthographic projection of the corresponding first pixel on the base substrate and covers an orthographic projection of the corresponding third pixel on the base substrate.

10. The touch display panel according to claim 1, further comprising a film packaging structure layer arranged between the display structure layer and the touch structure layer, wherein the film packaging structure layer comprises a first inorganic packaging layer, an organic packaging layer and a second inorganic packaging layer that are sequentially laminated.

11. The touch display panel according to claim 10, further comprising an organic protective layer arranged on a side of the black matrix layer facing away from the touch structure layer.

12. The touch display panel according to claim 11, further comprising a third inorganic insulation layer arranged on a side of the organic protective layer facing away from the touch structure layer, wherein materials of the third inorganic insulation layer comprise at least one of silicon oxide, silicon nitride, or silicon oxynitride.

13. The touch display panel according to claim 1, wherein the touch structure layer comprises a first touch metal sub-layer, a second touch metal sub-layer arranged on a side of the first touch metal sub-layer away from the display structure layer, and a first touch insulation layer arranged between the first touch metal sub-layer and the second touch metal sub-layer;

the second touch metal sub-layer comprises a plurality of first touch electrode blocks, and each of the first touch electrode blocks comprises the plurality of touch openings; and the first touch metal sub-layer comprises a plurality of first touch leads corresponding to the first touch electrode blocks one to one, and each of the plurality of first touch leads is electrically connected to a corresponding first touch electrode block through a via hole penetrating the first touch insulation layer.

14. The touch display panel according to claim 1, wherein the touch structure layer comprises a third touch metal sub-layer, a fourth touch metal sub-layer arranged on a side of the third touch metal sub-layer facing away from the display structure layer, and a second touch insulation layer arranged between the third touch metal sub-layer and the fourth touch metal sub-layer;

the fourth touch metal sub-layer comprises a plurality of first touch electrode strips extending in a first direction and a plurality of second touch electrode strips extending in a second direction; any one of the plurality of first touch electrode strips comprises a plurality of second touch electrode blocks that are electrically connected integrally, and any one of the plurality of second touch electrode strips comprises a plurality of third touch electrode blocks; any one of the plurality of second touch electrode block comprises the plurality of touch openings, and any one of the plurality of third touch electrode block comprises the plurality of touch openings; and the third touch metal sub-layer comprises a plurality of bridging parts, and two adjacent third touch electrode blocks are electrically connected by means of a corresponding bridging part of the plurality of bridging parts.

15. The touch display panel according to claim 13, wherein materials of a first insulation layer comprise at least one of silicon oxide, silicon nitride, or silicon oxynitride; and materials of a second insulation layer comprise at least one of silicon oxide, silicon nitride, or silicon oxynitride.

16. The touch display panel according to claim 14, wherein materials of a first insulation layer comprise at least one of silicon oxide, silicon nitride, or silicon oxynitride; and materials of a second insulation layer comprise at least one of silicon oxide, silicon nitride, or silicon oxynitride.

17. The touch display panel according to claim 13, wherein:

a first insulation layer comprises a first inorganic insulation sub-layer, and a second inorganic insulation sub-layer arranged on a side of the first inorganic insulation sub-layer facing the first light absorption layer;

and a material of the second inorganic insulation sub-layer comprises silicon nitride, and a material of the first inorganic insulation sub-layer comprises silicon oxide.

18. The touch display panel according to claim 17, wherein:

a second insulation layer comprises a third inorganic insulation sub-layer, and a fourth inorganic insulation sub-layer arranged on a side of the third inorganic insulation sub-layer facing the first light absorption layer; and a material of the fourth inorganic insulation sub-layer comprises silicon nitride, and a material of the third inorganic insulation sub-layer comprises silicon oxide.

19. The touch display panel according to claim 1, wherein a transmittance of reflection reducing structure layer ranges from 40% to 60% and a reflectivity of reflection reducing structure layer ranges from 0% to 10%;

wherein a thickness of the first light absorption layer accounts for 0.1%-10% of a thickness of the reflection reducing structure layer; and wherein a material of the first light absorption layer comprises titanium (Ti), molybdenum (Mo), cuprum (Cu), aluminum (Al) or argentum (Ag).

20. A display device, comprising the touch display panel according to claim 1.

* * * * *